United States Patent [19]

Umida

[11] Patent Number: 5,525,877
[45] Date of Patent: Jun. 11, 1996

[54] MOTOR VIBRATION CONTROL DEVICE AND METHOD FOR MATCHING A MOTOR SPEED DETECTED VALUE WITH A MOTOR SPEED REFERENCE VALUE

[75] Inventor: Hidetoshi Umida, Kanagawa, Japan

[73] Assignee: Fuji Electric Co., Ltd., Kanagawa, Japan

[21] Appl. No.: 355,399

[22] Filed: Dec. 13, 1994

[30] Foreign Application Priority Data

Dec. 14, 1993 [JP] Japan ................ 5-312363

[51] Int. Cl.$^6$ ................ H02P 7/00
[52] U.S. Cl. ................ 318/432; 318/632
[58] Field of Search ................ 318/432, 632, 318/610, 611, 798, 799, 815, 561, 800–814, 600, 601; 388/804, 812, 815, 820, 819, 930

[56] References Cited

U.S. PATENT DOCUMENTS

| | | | |
|---|---|---|---|
| 4,587,469 | 5/1986 | Ikebe et al. | 318/432 |
| 4,726,738 | 2/1988 | Nakamura et al. | 318/432 X |
| 4,748,555 | 5/1988 | Miyake et al. | 318/632 X |
| 5,274,313 | 12/1993 | Armheim | 318/611 X |
| 5,349,278 | 9/1994 | Wedeen | 318/632 |
| 5,442,268 | 8/1995 | Goodarzi et al. | 318/432 |
| 5,469,215 | 11/1995 | Nashiki | 318/432 |

FOREIGN PATENT DOCUMENTS

| | | |
|---|---|---|
| 0314800 | 5/1989 | European Pat. Off. . |
| 0329796 | 8/1989 | European Pat. Off. . |
| 3722099 | 7/1987 | Germany . |

OTHER PUBLICATIONS

Amin Suyitno, et al. Variable–Structured Robust Controller by Fuzzy Logic for Servomotors. IEEE Transactions on Industrial Electronics, 40: 80–87 (1993).

Kakaji Umeno, et al. Robust Speed Control of DC Servomotors Using Modern Two Degrees-of-Freedom Controller Design. IEEE Transactions on Industrial Electronics, 38: 363–368 (1991).

European Search Report dated Apr. 24, 1995. In re patent application No. 94119773.3.

*Primary Examiner*—Jonathan Wysocki
*Attorney, Agent, or Firm*—Elman & Fried

[57] ABSTRACT

A motor vibration control device includes a speed adjusting unit for outputting a driving torque reference value based on the difference between a speed reference value to a motor and a detected speed value of the motor; a current adjusting unit for adjusting the current to be provided for the motor and outputting a driving torque value based on the current; a compensation torque calculator for calculating a compensation torque value based on the detected speed value, the driving torque reference value, and the driving torque value; an amplifying unit for amplifying the compensation torque value; and an adder for adding the driving torque reference value to the amplified compensation torque value and outputting the sum to the current adjusting unit. With this simple circuit configuration, the device suppresses the torsional vibration generated by an operating motor.

10 Claims, 10 Drawing Sheets

MOTOR VIBRATION CONTROL DEVICE AND METHOD FOR MATCHING A MOTOR SPEED DETECTED VALUE WITH A MOTOR SPEED REFERENCE VALUE

BACKGROUND OF THE INVENTION

1. Field of the Invention

The present invention relates to a motor control device for controlling a control object, that is, a motor, such that the operation speed reaches a target value, and more specifically to a motor vibration control device for suppressing the torsional vibration in controlling the operation speed.

2. Description of the Related Art

Setting a motor at a predetermined operation speed can be performed by detecting the actual operation speed of the motor and controlling the electric power provided for the motor based on the difference between the predetermined operation speed and the detected operation speed.

However, since the phase of the loop transfer function of a control system is delayed, the torsional vibration can be generated at a loaded equipment connected to the shaft of a motor.

Figure 1:
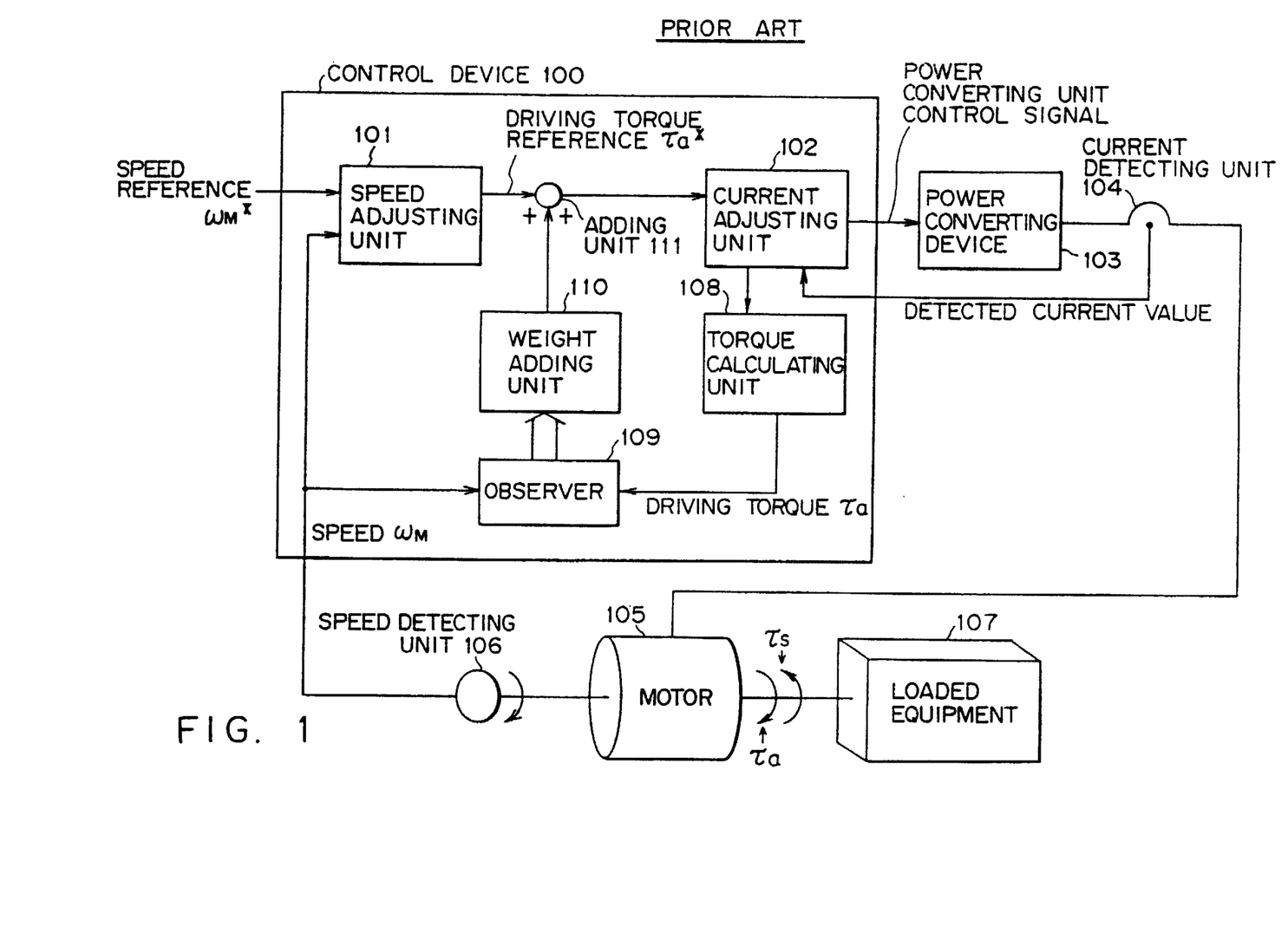
FIG. 1 shows the configuration of the conventional motor vibration control device.

FIG. 1 is a block diagram showing the configuration of the conventional vibration control device of a motor.

In FIG. 1, a motor 105 is equipped with a control device 100, a power converting unit 103, a current detecting unit 104, a speed detecting unit 106, etc. It transfers the power to a loaded equipment 107 by driving the motor 105 by an output from the control device 100 at a variable speed through the power converting unit 103. In this configuration, the control device 100 is equipped with a speed adjusting unit 101, a current adjusting unit 102, an observer (state observing unit) 109 for estimating the speed and the shaft torque of the loaded equipment system, a weight adder 110, and a torque calculator 108 for calculating a driving torque according to a current value from the current adjusting unit 102.

The speed adjusting unit 101 outputs a driving torque reference $\tau_a^*$ to set to 0 the difference between a speed reference $\omega_M^*$ and the actual operation speed $\omega_M$ of the motor 105 output by the speed detecting unit 106. The driving torque reference $\tau_a^*$ is output as a current value, added by an adder 111 to the current value output by the weight adder 110, and input to the current adjusting unit 102. The current adjusting unit 102 controls the electric current such that the difference between the current value obtained by the above mentioned addition and the current value Id detected by the current detecting unit 104 and actually input to the motor 105 can be set to 0. It outputs a power converting unit control signal Cp to the power converting unit 103. The power converting unit 103 provides an electric power for the motor 105 according to the power converting unit control signal Cp from the current adjusting unit 102.

If the driving torque reference $\tau_a^*$ is input to the current adjusting unit 102 without being added to the output of the weight adder 110, then formed is a control circuit of the speed adjusting unit 101, current adjusting unit 102, power converting unit 103, current detecting unit 104, motor 105, speed detecting unit 106, and then back to the speed adjusting unit 101. If the phase of the loop transfer function of the control system is delayed by 180° or more, a torsional vibration occurs. The phase delay must be reduced to suppress the torsion vibration. Thus, in a 2-mass system, for example, the observer 109 outputs to the weight adder 110 the estimated shaft torque $\hat{\tau}_s$ and load speed $\hat{\omega}_L$. The weight adder 110 performs the equation $g_1\hat{\tau}_s + g_2\hat{\omega}_L$ ($g_1$ and $g_2$ represent respective gains), and calculates the current value to be added to the driving torque reference $\tau_a^*$. Therefore, the phase of the loop transfer function of the control system can be advanced by adding the output of the weight adder 110 to the driving torque reference $\tau_a^*$.

The observer 109 is structured according to the algorithm of, for example, Mr. Gopinath based on the equation model representing a complicated mechanical system. That is, in this system, the state variables such as a shaft torque $\tau_s$, load speed $\omega_L$, etc. are added through the weight adder 110 to the driving torque reference $\tau_a^*$ output by the speed adjusting unit 101, thereby suppressing the torsional vibration of the mechanical system.

The observer 109 is derived from the equation model of the mechanical system and the degree of the transfer function is equal to or higher than the mechanical system in principle. Therefore, the more complicated the mechanical system gets, the more complicated its structure also becomes. Thus, it becomes more difficult to realize the system and adjust its operations. For example, the observer of a 2 mass mechanical system is equipped with 3 integrators, and the observer of a 3 mass mechanical system is equipped with 5 or more integrators. Since the observer is the optimum solution when the structure of the mechanical system is well known, the characteristics are degraded if there arise changes in parameter or structure of the mechanical system, thereby possibly causing the problem that a desired control characteristic cannot be guaranteed.

Accordingly, the present invention aims to successfully control the torsional vibration in a simple structure regardless of a complicated loading mechanical system.

SUMMARY OF THE INVENTION

The present invention aims to provide a motor vibration control device capable of controlling using a simple circuit configuration the torsional vibration generated at the operation of the motor and of saving trouble in adjusting the operation.

The present invention can be realized by a motor vibration control device comprising a speed adjusting unit for controlling the motor such that a detected speed value can reach a target value, that is, a speed reference value and a current adjusting unit for controlling the current for the motor according to the output of the speed adjusting unit. The motor vibration control device further comprises a disturbance observer for estimating the shaft torque of the motor based on an output of a torque calculator and the motor speed, an amplifier for amplifying an output of the disturbance observer, a filter for receiving the detected speed value, and an amplifier for amplifying an output of the filter. The present invention can be designed to replace the disturbance observer with a circuit for differentiating and amplifying a driving torque reference $\tau_a^*$, a circuit for differentiating and amplifying a detected speed value $\omega_M$, and a compensation torque calculator for incrementing or decrementing the calculation results and a detected driving torque $\tau_a$ and transmitting the result to the filter having the transfer function G(s).

DESCRIPTION OF THE PREFERRED EMBODIMENTS

According to the present invention, a motor control device comprises a speed adjusting unit for controlling a motor such that a detected speed value can reach a target value, that is, a speed instructed value and a current adjusting unit for controlling the electric current to be provided for the motor according to the output of the speed adjusting unit. The device also comprises a disturbance observer for estimating a shaft torque of the motor, a first amplifier for amplifying an output of the disturbance observer, a filter for receiving a speed detection signal, and a second amplifier for amplifying an output of the filter. It adds an output of the first amplifier to an output of the speed adjusting unit, subtracts an output of the second amplifier from added value and then stores the result in the current adjusting unit. According to the first principle, the device can also comprise another amplifier for amplifying the output of the speed adjusting unit, subtracting the result from the input of the disturbance observer, and then adding the result to the output of the disturbance observer.

Figure 2:
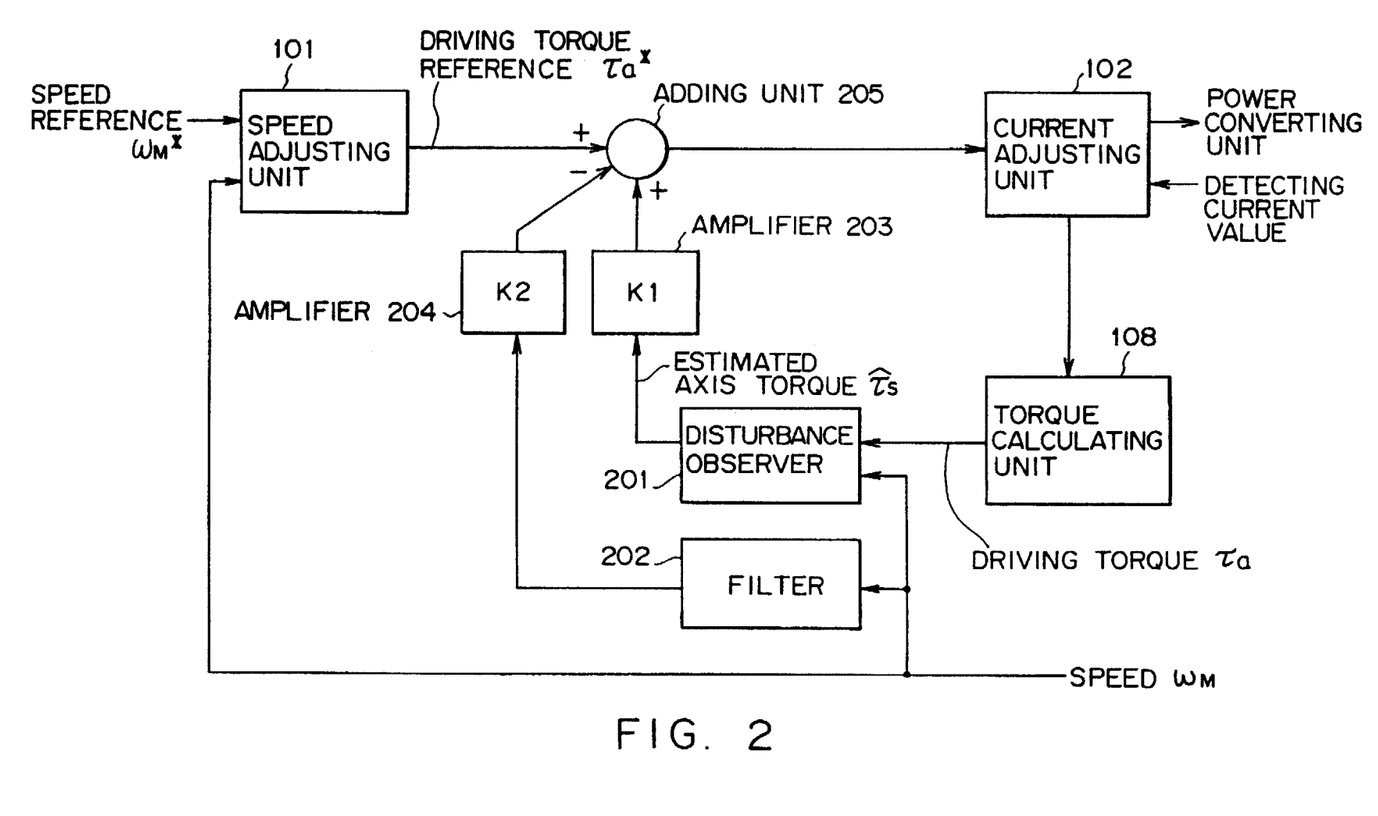
FIG. 2 is a block diagram showing the configuration of the first embodiment.

FIG. 2 is a block diagram showing the configuration of the first embodiment.

It shows the inside of the control device, according to the first embodiment, provided with a disturbance observer 201, a filter 202, and amplifiers 203 and 204. The speed adjusting unit 101, current adjusting unit 102, and torque calculator 108 are the same as those of the control device 100 shown in FIG. 1.

That is, the amplifiers 203 and 204 amplify an estimated shaft torque ks of a motor calculated by the disturbance observer 201 using a driving torque $\tau_a$ and an operation speed $\omega_M$ of the motor 105 not shown, and the variation of speed obtained through the filter 202. Then, the outputs of the amplifiers 203 and 204 are added to or subtracted from the driving torque reference $\tau_a^*$, that is, the output of the speed adjusting unit 101. With the configuration, a shaft torsional vibration, if existing, can be successfully controlled because the torque phase accelerating the inertia of a motor can be adjusted by the disturbance observer 201 and the filter 202. Described below in detail is the process of suppressing the torsional vibration. The disturbance observer 201 functions as estimating the shaft torque $\hat{\tau}_s$ according to the motor speed $\omega_M$ and the driving torque $\tau_a$. As with the conventional devices, the present invention is designed based on the algorithm of Mr. Gopinath the input/output relations of which are represented by the following equation (1).

$$\hat{\tau}_s = (\tau_a - sJ_M \, \omega_M) \cdot G(s) \tag{1}$$

where $\tau_a - sJ_M \, \omega_M = \tau_s$; s indicates a Laplace operator; $\tau_a$ indicates a driving torque; $\tau_s$ indicates a shaft torque; $J_M$ indicates an inertia moment of the motor 105; $\omega_M$ indicates the operation speed of a motor; and G(s) indicates the transfer function of the disturbance observer 201.

The torque calculator 108 calculates the driving torque $\tau_a$ according to the current value output by the speed adjusting unit 101. Generally, the driving torque $\tau_a$ can be easily obtained based on a detected current value, the winding of a coil of the motor 105, etc. If it cannot be calculated easily, the torque calculator 108 should be given a current reference indicating the transfer function H(s) of the torque calculator 108 equivalent to that of the current adjusting unit 102. The filter 202 has the transfer function F(s) and receives the operation speed $\omega_M$ of a motor. Then, the estimated shaft torque $\hat{\tau}_s$ is amplified by the amplifier 203 of gain K1 and added to the driving torque reference $\tau_a^*$ output by the speed adjusting unit 101, and the output of the filter 202 is amplified by the amplifier 204 of gain K2 and subtracted from the driving torque reference $\tau_a^*$, thereby calculating the speed $\omega_M$ by the following equation (2).

The transfer function related to $\tau_s$ in the second term on right side in equation (2) can be set to adjust a phase by appropriately setting G(s), F(s), K1, K2, etc. For example, G(s) and F(s) can be set as shown in the following equations (3) and (4) where, $$\omega_M = \frac{1}{sJ_M} \{H(s)(\tau_a^* + K1\hat{\tau}_s - K2F(s)\omega_M) - \tau_s\} \tag{2}$$

Therefore, $$\begin{aligned}
\omega_M &= \frac{1}{K2H(s)F(s) + sJ_M} \{H(s)(\tau_a^* + K1\hat{\tau}_s) - \tau_s\} \\
&= \frac{1}{K2H(s)F(s) + sJ_M} H(s)\tau_a^* - \\
&\quad \frac{1}{K2H(s)F(s) + sJ_M} (1 - H(s)G(s)K1)\tau_s
\end{aligned} \tag{3}$$

for example, a high-pass filter is used as an equivalence to the transfer function of the disturbance observer 201 and the filter 202.

$$G(s) = \frac{\omega c1}{s + \omega c1} \tag{4}$$

($\omega c1$ indicates a cutoff frequency of disturbance observer 201)

$$F(s) = \frac{s}{s + \omega c2} \tag{5}$$

($\omega c2$ indicates a cutoff frequency of a filter 202)

For simplification, H(s)=1 is assigned to equation (3) and it can be represented as the following equation (6).

The second term on right side of equation (6) indicates the phase advance by the filter 202, and the $$\begin{aligned}
\omega_M &= \frac{1}{K2F(s) + sJ_M} \{\tau_a^* - (1 - G(s)K1)\tau_s\} \\
&= \frac{1}{sJ_M} \times \frac{s + \omega c2}{s + \omega c2 + K2/J_M} \times \\
&\quad \left\{ \tau_a^* - \frac{s + \omega c1(1 - K1)}{s + \omega c1} \tau_s \right\}
\end{aligned} \tag{6}$$

second term in the brace of the third term indicates the phase advance by the disturbance observer 201 for a shaft torque. Thus, it is obvious that phases can be adjusted in relation to the component of the shaft torque $\tau_s$ and the driving torque reference $\tau_a^*$ by appropriately setting the transfer functions of the disturbance observer 201 and the filter 202 and the feedback gains K1 and K2 by the amplifiers 203 and 204. Since the resonance of a mechanical system is generated by a transfer delay between the motor operation speed $\omega_M$ and the loaded equipment speed due to the shaft torsional of the motor, the torsional vibration can be controlled by improving the above described phase characteristics.

Figure 3:
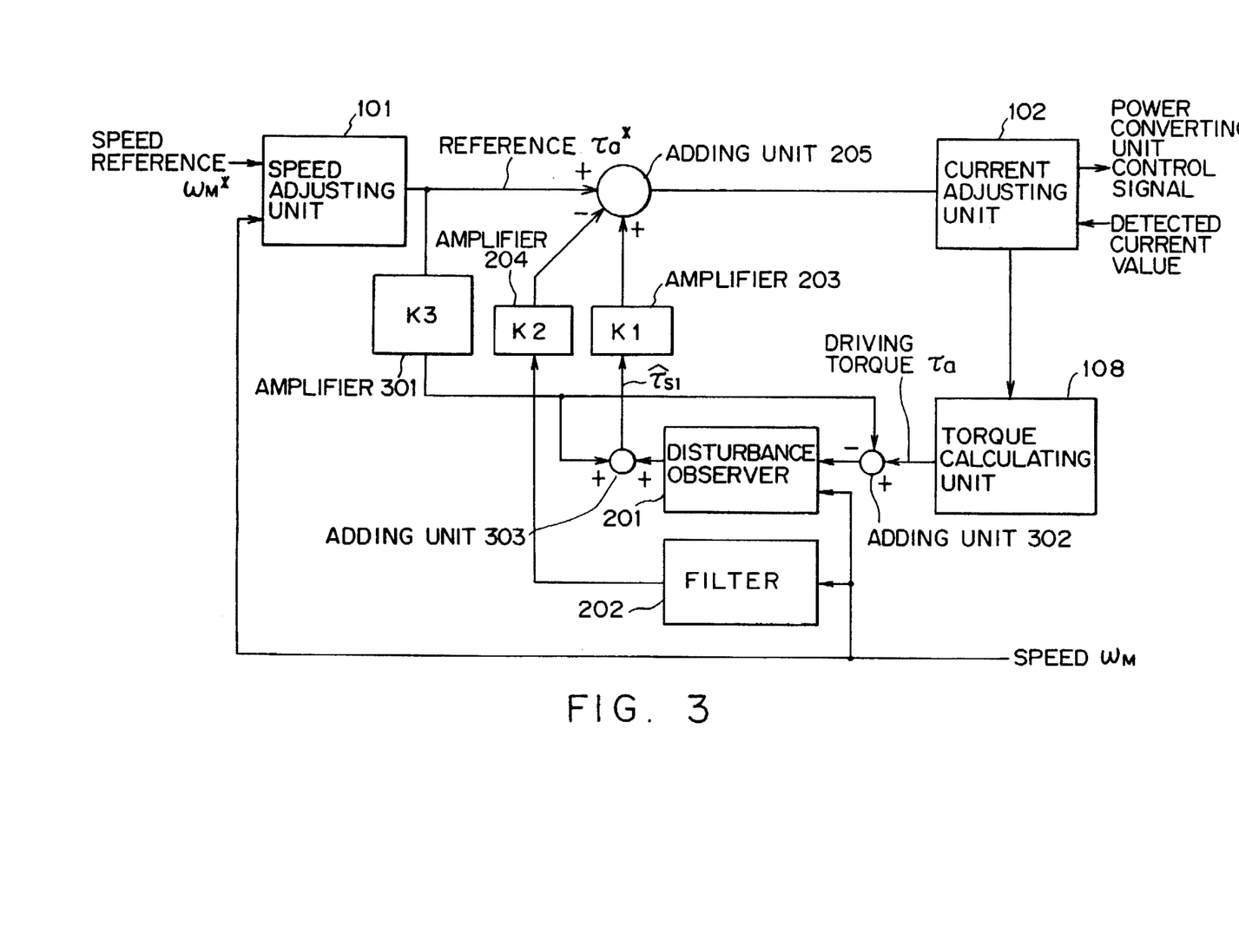
FIG. 3 is a block diagram showing the configuration of the second embodiment.

FIG. 3 is a block diagram showing the second embodiment of the present invention.

As compared with FIG. 2, the embodiment shown in FIG. 3 further comprises an amplifier 301. That is, the output of the speed adjusting unit 101 can be phase-adjusted by amplifying the output of the speed adjusting unit 101 by the amplifier 301, subtracting the result from the driving torque $\tau_a$, and adding the output of the amplifier 301 to the output of the disturbance observer 201. Thus, the torsional vibration can be controlled more effectively than in the first embodiment. The following equations represent this clearly.

Assuming that the gain of the amplifier 301 is K3, the estimated torque $\hat{\tau}_{s1}$ is calculated by the following equation (7).

$$\begin{aligned}\hat{\tau}_{s1} &= \{(\tau_a - K3\tau_a^*) - sJ_M\omega_M\} \cdot G(s) + K3\tau_a^* \\ &= (\tau_a - sJ_M\omega_M) \cdot G(s) + K3(1 - G(s))\tau_a^* \\ &= G(s)\tau_s + K3(1 - G(s))\tau_a^*\end{aligned} \quad (7)$$

If $\hat{\tau}_{s1}$ is assigned in equation (2) in place of $\hat{\tau}_s$, the following equation (8) is established.

The transfer function related to the driving torque reference $\tau_a^*$ in the first term in the brace in the second term on right side in equation (9) indicates that the phase delay to the driving torque reference $\tau_a^*$ can be adjusted by properly setting gain $$\omega_M = \frac{1}{sJ_M} \{H(s)(\tau_a^* + K1\tau_s - K2F(s)\omega_M) - \tau_s\} \quad (8)$$

Therefore, $$\begin{aligned}\omega_M &= \frac{1}{K2H(s)F(s) + sJ_M} \{H(s)(\tau_a^* + K1\hat{\tau}_{s1}) - \tau_s\} \\ &= \frac{1}{K2H(s)F(s) + sJ_M} \cdot H(s)\{1 + K1K3(1 - G(s))\}\tau_a^* - \\ &\quad \frac{1}{K2H(s)F(s) + sJ_M} \cdot \{1 - H(s)G(s)K1\}\tau_s\end{aligned} \quad (9)$$

K3. For example, assuming that H(s) is 1 and G(s) is calculated by equation (4), then equation (9) can be represented as equation (10).

$$\omega_M = \frac{1}{K2F(s) + sJ_M} \cdot \frac{(K1K3 + 1)s + \omega c1}{s + \omega c1} \tau_a^* - \frac{1}{K2F(s) + sJ_M} \cdot \frac{s + \omega c1(1 - K1)}{s + \omega c1} \tau_s \quad (10)$$

Described below is the second principle of the present invention.

According to the present principle, a motor control device comprises a speed adjusting unit for controlling a motor such that a detected speed value can reach a target value and a current adjusting unit for controlling the electric current to be provided for the motor according to the output of the speed adjusting unit. The device further comprises a disturbance observer for estimating the shaft torque for inertia larger than the inertia of the motor and an amplifier for amplifying the output of the disturbance observer. The output of the amplifier is added to the output of the speed adjusting unit and the result is input to the current adjusting unit. According to the second principle, the device can furthermore comprise another amplifier for amplifying the output of the speed adjusting unit, subtracting the result from the input of the disturbance observer, and adding it to the output of the disturbance observer.

Figure 4:
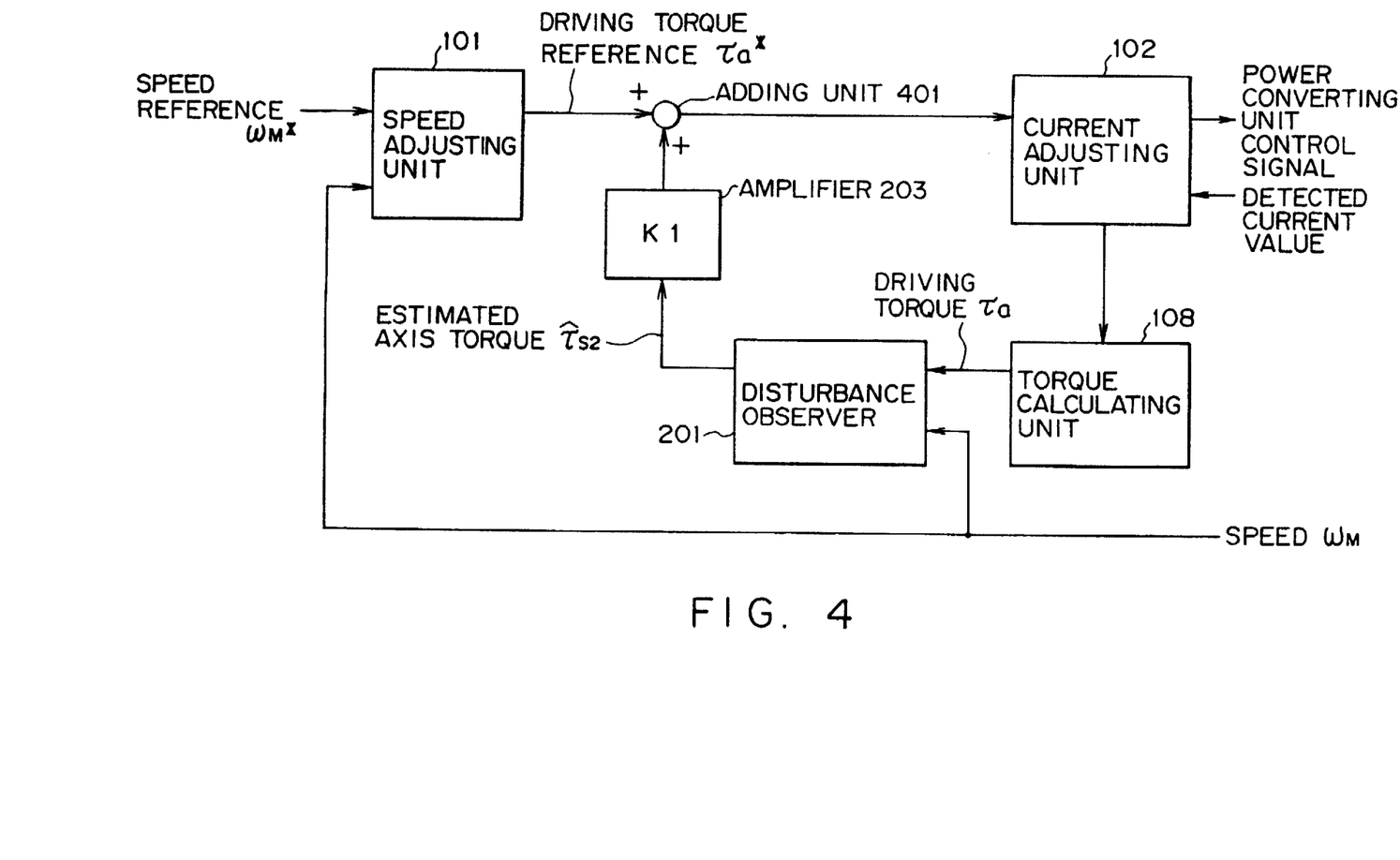
FIG. 4 is a block diagram showing the configuration of the third embodiment.

FIG. 4 is a block diagram showing the third embodiment of the present invention.

In this embodiment, the disturbance observer 201 for calculating the estimated motor torque $\hat{\tau}_s$ based on the driving torque $\tau_a$ and the speed $\omega_M$ is assumed to have mechanical system inertia larger than that of the motor itself. The observer is designed to have a transfer function such that the optimum phase compensation can be assured as reaction toward resonance. Thus, the filter shown in FIG. 2 can be successfully omitted. The estimated torque $\hat{\tau}_{s2}$ is amplified by the amplifier 203 and is added to the driving torque reference $\tau_a^*$, that is, an output from the speed adjusting unit 101, thereby suppressing the vibration of the motor, even if torsional vibration occurs, by advancing through the compensation effect of the disturbance observer 201 the torque phase accelerating the inertia of the motor.

The more practical explanation about this process is given below.

Assuming that the estimated torque obtained from the disturbance observer 201 is $\hat{\tau}_{s2}$, the inertia $J_M$ in equation (1) can be replaced with $J_M'$ in equation (11) as follows.

$$\begin{aligned}\hat{\tau}_{s2} &= (\tau_a - sJ_M'\omega_M) \cdot G(s) \\ &= (\tau_a - sJ_M\omega_M) \cdot G(s) - s(J_M' - J_M)G(s)\omega_M \\ &= G(s)\tau_s - s(J_M' - J_M)G(s)\omega_M\end{aligned} \quad (11)$$

Multiplying the result by K1 through the amplifier 203 and adding the product to the driving torque reference $\tau_a^*$ are represented in the following equation (12).

$$\begin{aligned}\omega_M &= \frac{1}{sJ_M} \{H(s)(\tau_a^* + K1\hat{\tau}_{s2}) - \tau_s\} \\ &= \frac{1}{sJ_M} H(s)\tau_a^* - (1 - H(s)G(s)K1)\tau_s - \\ &\quad \frac{1}{sJ_M} \cdot s(J_M' - J_M)K1H(s)G(s)\omega_M\end{aligned} \quad (12)$$

Therefore, $$\omega_M = \frac{1}{sJ_M} \times \frac{1}{1 + (J_M'/J_M - 1)K1H(s)G(s)} \times \{H(s)\tau_a^* - (1 - H(s)G(s)K1)\tau_s\} \quad (13)$$

The third term on right side in equation (13) is the same as the second term on right side in equation (3) and indicates the phase advance in the third term on right side of equation (13) if $J_M'$ as well as G(s) is set to an appropriate value larger than $J_M$. For example, H(s)=1 and G(s) equal to the value in equation (4) are assigned to the above equation (13) resulting in equation (14).

$$\omega_M = \frac{1}{sJ_M} \times \frac{s + \omega c1}{s + J_M'/J_M \cdot \omega c1 \cdot K1} \times \{\tau_a^* - (1 - G(s)K1)\tau_s\} \quad (14)$$

This equation is the same as equation (6) where $\omega c1 = \omega c2$ and $K2 = (J_M' - J_M) \times \omega c1$. The torsional vibration can be suppressed as in the first principle of the present invention by appropriately assigning a set parameter of the disturbance observer and gain K1 of the amplifier.

Figure 5:
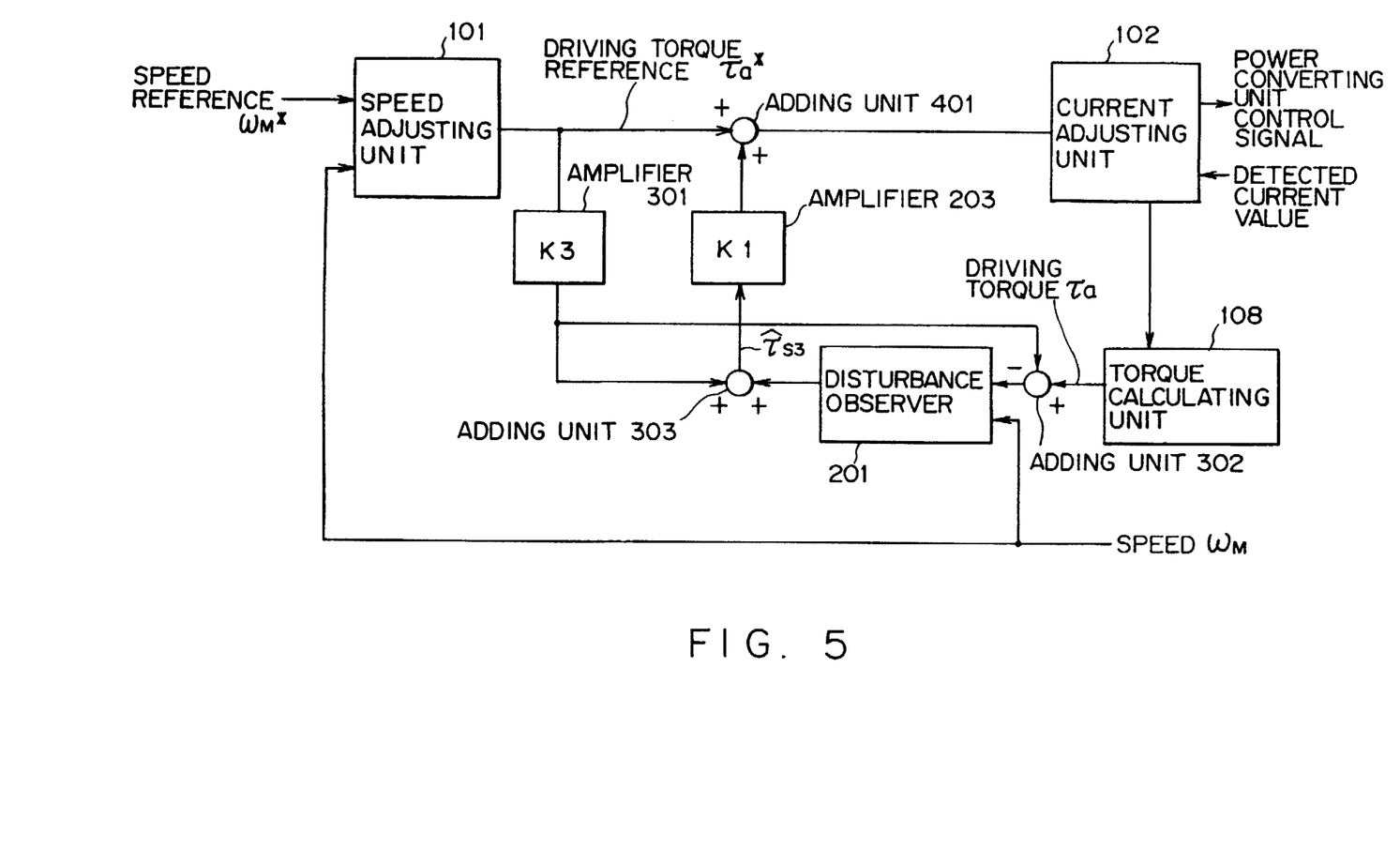
FIG. 5 is a block diagram showing the configuration of the fourth embodiment.

FIG. 5 is a block diagram showing the fourth embodiment of the present invention. As clearly shown in FIG. 5, this embodiment includes the amplifier 301 in addition to the configuration shown in FIG. 4. That is, the output of the speed adjusting unit 101 is amplified by the amplifier 301 and the result is subtracted from the driving torque $\tau_a$. Then, the output of the amplifier 301 is added to the output of the disturbance observer 201. Thus, the output of the speed adjusting unit 101 can be phase-advanced, thereby suppressing the torsional vibration. The practical process is described below by referring to the following equations.

Assuming that the gain of the amplifier 301 is K3, the estimated torque $\hat{\tau}_{s3}$ is calculated by equation (15) as in equation (7) above.

$$\begin{aligned}\hat{\tau}_{s3} &= \{(\tau_a - K3\tau_a^*) - sJ_M\omega_M\} \cdot G(s) + K3\tau_a^* \quad (15)\\ &= (\tau_a - sJ_M\omega_M) \cdot G(s) + K3(1 - G(s))\tau_a^*\\ &= G(s)\tau_s - S(J'_M - J_M)G(s)\omega_M + K3(1 - G(s))\tau_a^*\end{aligned}$$

If $\hat{\tau}_{s3}$, instead of $\hat{\tau}_s$, is assigned to equation (15), the $\omega_M$ is obtained by the following equation (16).

$$\begin{aligned}\omega_M &= \frac{1}{sJ_M}\{H(s)(\tau_a^* + K1\hat{\tau}_{s3} - \tau_s\}\quad(16)\\ &= \frac{1}{sJ_M} \cdot \frac{1}{1+(J_M/J_M - 1)K1H(s)G(s)} \times\\ &\quad |H(s)\{1 + K1K3(1 - G(s))\tau_a^* - (1 - H(s)G(s)K1)\tau_s|\end{aligned}$$

The second term of equation (16) is represented by equation (13), and also the third term of equation (16) is represented by equation (9). Both terms indicate phase advance capabilities. Therefore, setting the transfer function G(s) of the disturbance observer 201 and the gains K1 and K3 of the amplifiers 203 and 301 to appropriate values improves phase characteristics and suppresses torsional vibration.

The third principle of the present invention is described below.

As described above, torsional vibration can be suppressed by the disturbance observer 201. However, incorporating the disturbance observer 201 into a control device complicates the configurations of the disturbance observer 201 and the control device, and also requires time for adjustment.

According to the present principle of the present invention, the torsional vibration of a motor is suppressed in a simple circuit configuration without the disturbance observer 201.

The motor vibration control device according to the present principle comprises a speed adjusting unit for outputting a driving torque reference $\tau_a^*$ by an adjusting operation performed such that a speed $\omega_M$ matches a speed reference $\omega_M^*$, and a current adjusting unit for adjusting the driving torque $\tau_a$ obtained from the detected current value of the motor such that it matches the driving torque reference $\tau_a^*$. The motor control device for controlling the motor according to an output signal from the current adjusting unit comprises a compensation torque calculating unit for receiving the speed $\omega_M$, the driving torque $\tau_a$, and the driving torque reference $\tau_a^*$, adding the driving torque $\tau_a$, to the driving torque reference $\tau_a^*$ after being differentiated and amplified, subtracting the speed $\omega_M$ after being differentiated and amplified from the added value, and outputting the result through a filter; an amplifier for amplifying a compensation torque signal output by the compensation torque calculator; and an adder for adding the output of the amplifier to the driving torque reference $\tau_a^*$ and providing the sum as a new driving torque reference value for the current adjusting unit.

In the circuit where the disturbance observer 201 is used, the transfer function (1−G(s)) in the second term on right side of equation (15) is realized by the disturbance observer 201, and generally interrupts direct currents. If s·G(s), instead of the transfer function (1−G(s)), is assigned to equation (15), then the following equation (17) is represented as follows.

$$\begin{aligned}\hat{\tau}_{s3} &= (\tau_a - s \cdot J_M \cdot \omega_M) \cdot G(s) + K3 \cdot s \cdot G(s) \cdot \tau_a^*\quad(17)\\ &= G(s) \cdot (\tau_a - s \cdot J_M \cdot \omega_M + K3 \cdot s \cdot \tau_a^*)\end{aligned}$$

Since the present principle comprises a compensation torque calculator composed of a filter having a transfer function G(s), a differentiator, and an amplifier, torsional vibration to perform equation (17) can be suppressed without the disturbance observer 201.

Figure 6:
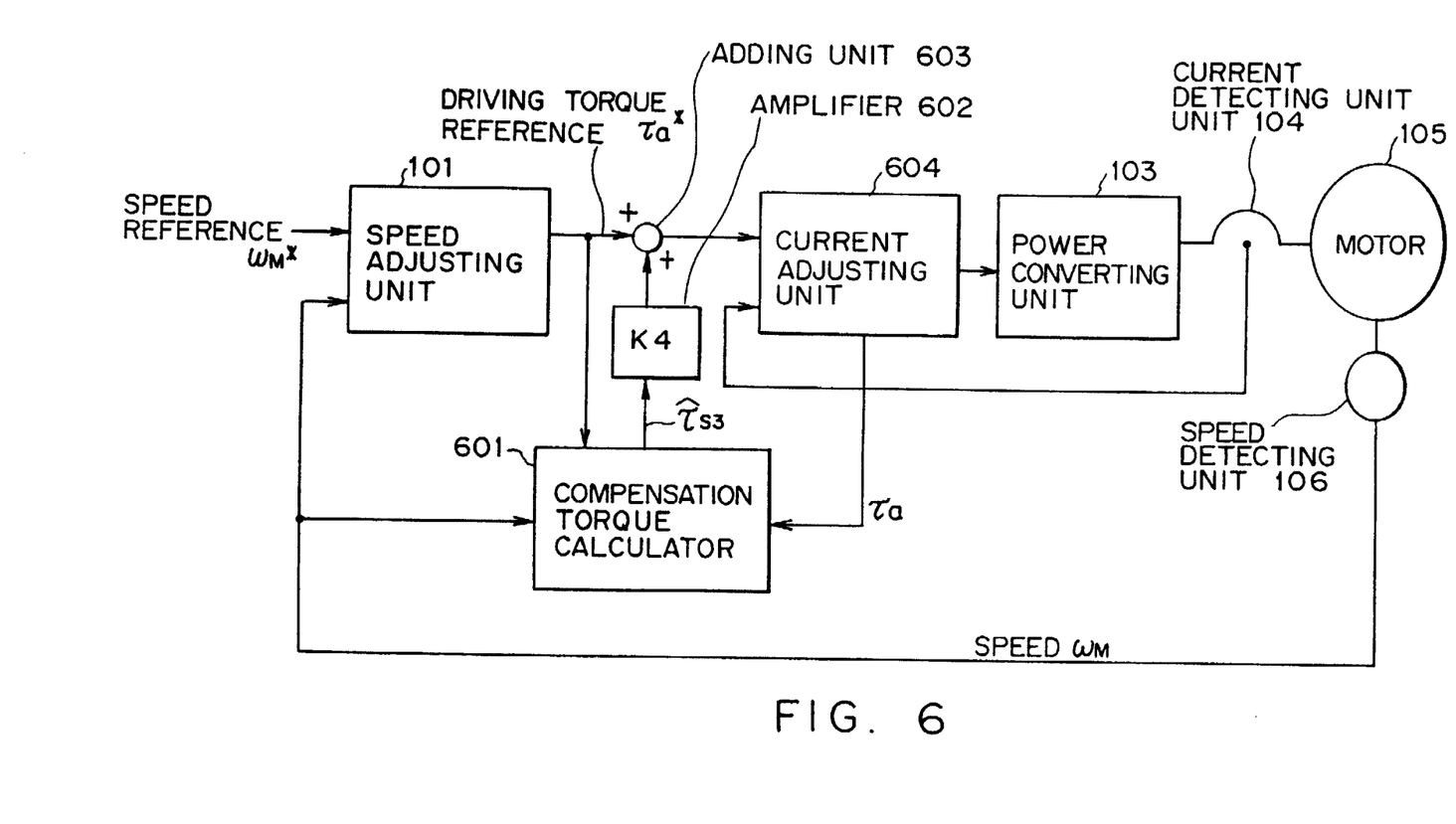
FIG. 6 is a block diagram showing the configuration of the fifth embodiment.

FIG. 6 is a block diagram showing the configuration of the fifth embodiment of the present invention. In this embodiment, a compensation torque calculator 601 is provided instead of the disturbance observer 201. The compensation torque calculator 601 receives a detected speed $\omega_M$ output by the speed detecting unit 106, a driving torque reference $\tau_a^*$ output by the speed adjusting unit 101, and a driving torque $\tau_a$ output by a current adjusting unit 604 (the current adjusting unit 604 receives a detected current value from the current detecting unit 104 and calculates a driving torque $\tau_a$). The compensation torque calculator 601 comprises a filter having the same transfer function G(s) as the above described disturbance observer 201, a differentiator, and an amplifier to perform the operation according to equation (17) and output a compensation torque $\hat{\tau}_{s3}$ necessary to suppress the shaft vibration and improve the phase characteristics of a speed control loop. The compensation torque $\hat{\tau}_{s3}$ is amplified up to the optimum value by an amplifier 602 and then added to the driving torque reference $\tau_a^*$ by an adder 603 and transmitted to the current adjusting unit 604.

Figure 7:
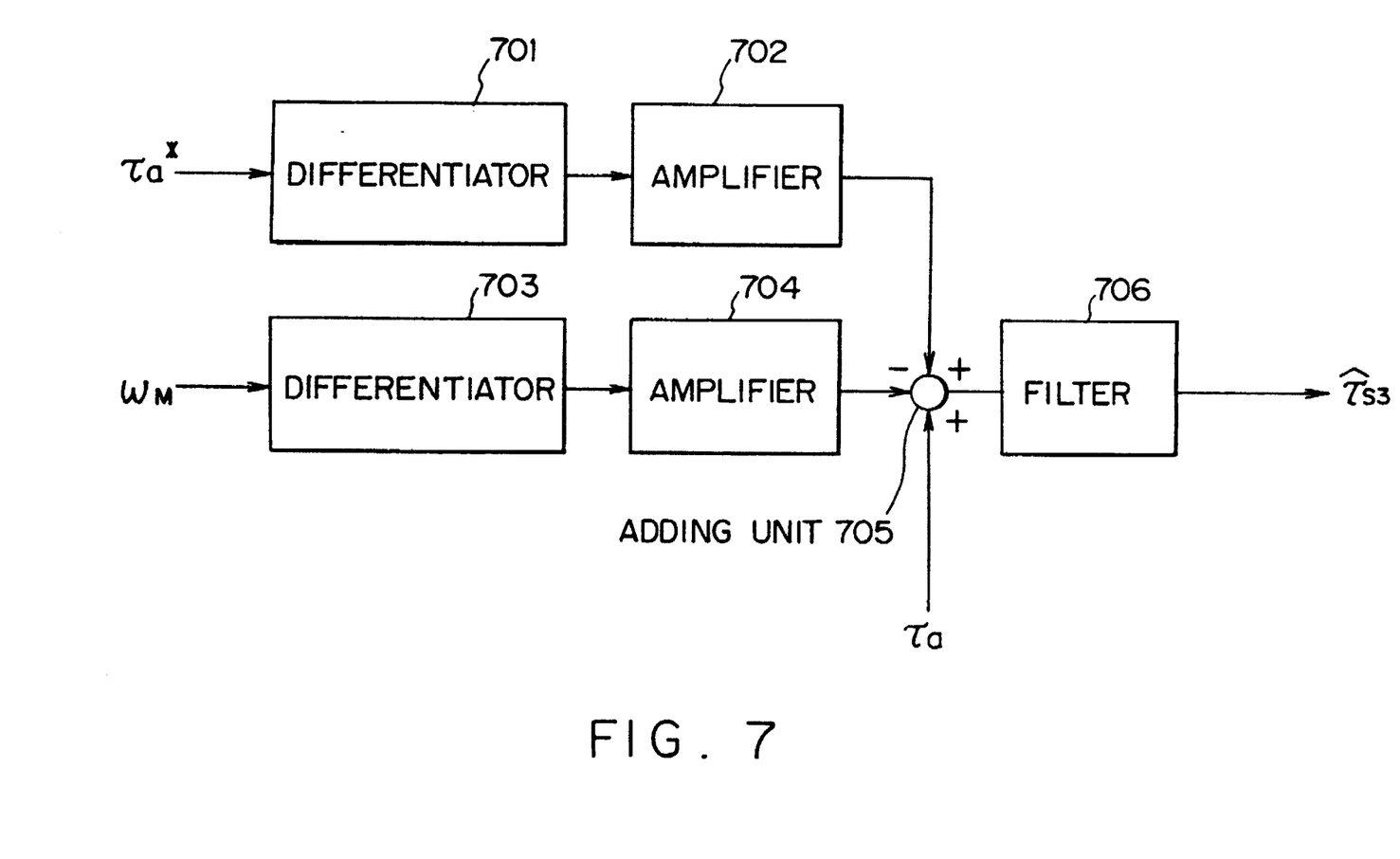
FIG. 7 is a block diagram showing the configuration of the sixth embodiment.

FIG. 7 is a block diagram showing the configuration of the sixth embodiment, and specifically the configuration of the compensation torque calculator 601 shown in FIG. 6. According to the sixth embodiment, the driving torque reference $\tau_a^*$ received from the speed adjusting unit 101 is differentiated by a differentiator 701 and amplified by an amplifier 702 to calculate $K3 \cdot s \cdot \tau_a^*$. Likewise, the detected speed value $\omega_M$ received from the speed detecting unit 106 is differentiated by a differentiator 703 and amplified by an amplifier 704 to calculate $s \cdot J'_M \cdot \omega_M$. An adder 705 adds the detected driving torque $\tau_a$ to the $K3 \cdot s \cdot \tau_a^*$ output by the amplifier 702 and subtracts the $s \cdot J'_M \cdot \omega_M$ output by the amplifier 704. The calculation result is $\tau_a - s \cdot J'_M \cdot \omega_M + K3 \cdot s \cdot \tau_a^*$. The calculation result is entered in a filter 706, and the filter 706 outputs the compensation torque $\hat{\tau}_{s3}$ according to equation (17).

Figure 8:
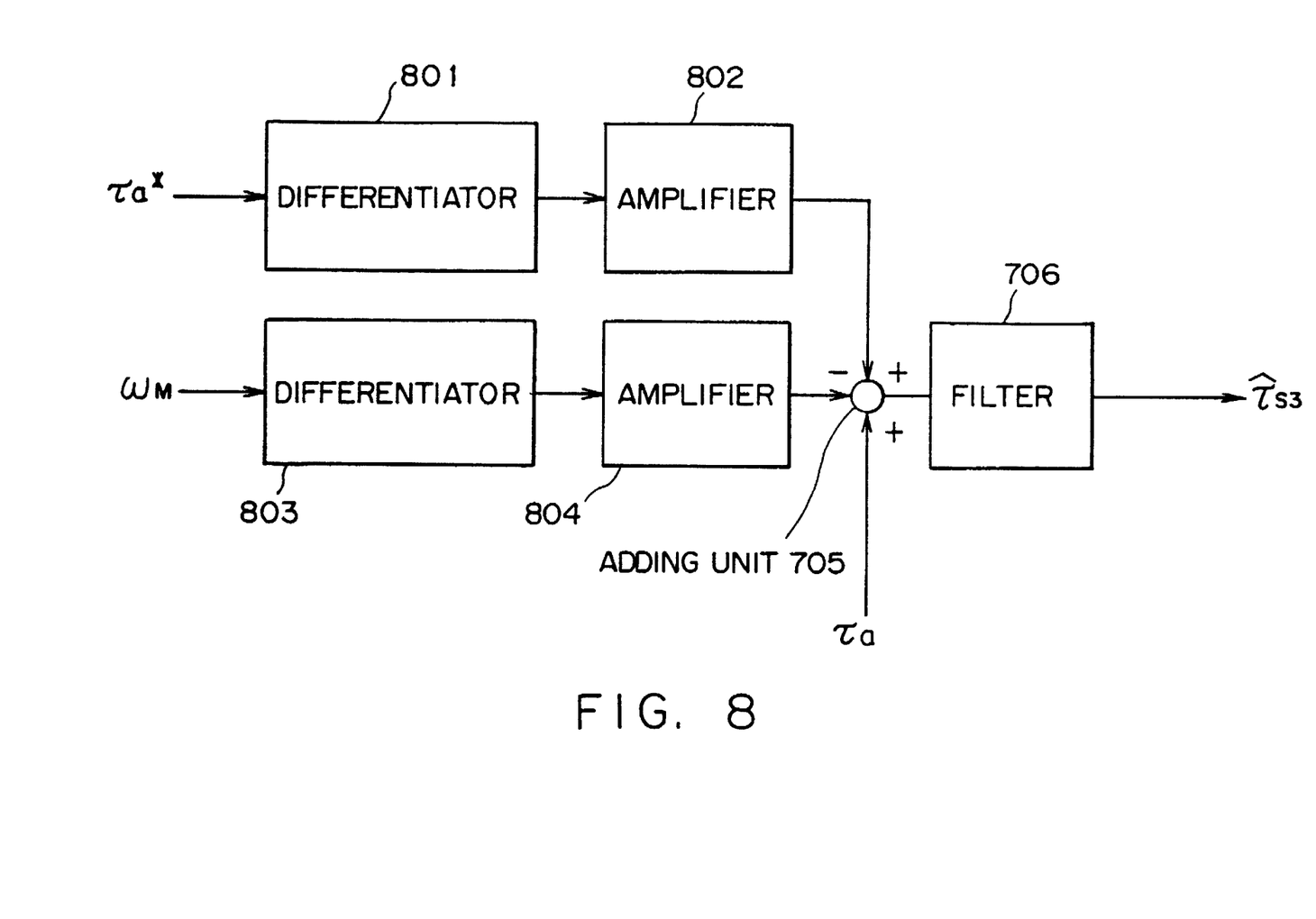
FIG. 8 is a block diagram showing the configuration of the seventh embodiment.

FIG. 8 is a block diagram showing the configuration of the seventh embodiment of the present invention, and specifically shows another configuration of the compensation torque calculator 601 shown in FIG. 6. According to the seventh embodiment, the $K3 \cdot s \cdot \tau_a^*$ can be obtained by amplifying through an amplifier 801 the driving torque reference $\tau_a^*$ received by the speed adjusting unit 101 and by differentiating the result through a differentiator 802. Likewise, the speed $\omega_M$ received by the speed detecting unit 106 is amplified by an amplifier 803 and differentiated by a differentiator 804 to calculate the $s \cdot J'_M \cdot \omega_M$. The adder 705 adds the driving torque $\tau_a$ output by the current adjusting unit 604 to the output of the differentiator 802 to subtract the output of the differentiator 804. If the calculation result of the adder 705 is input to the filter 706 having the transfer function G(s), then the filter 706 outputs the compensation torque $\hat{\tau}_{s3}$ represented in equation (17).

Figure 9:
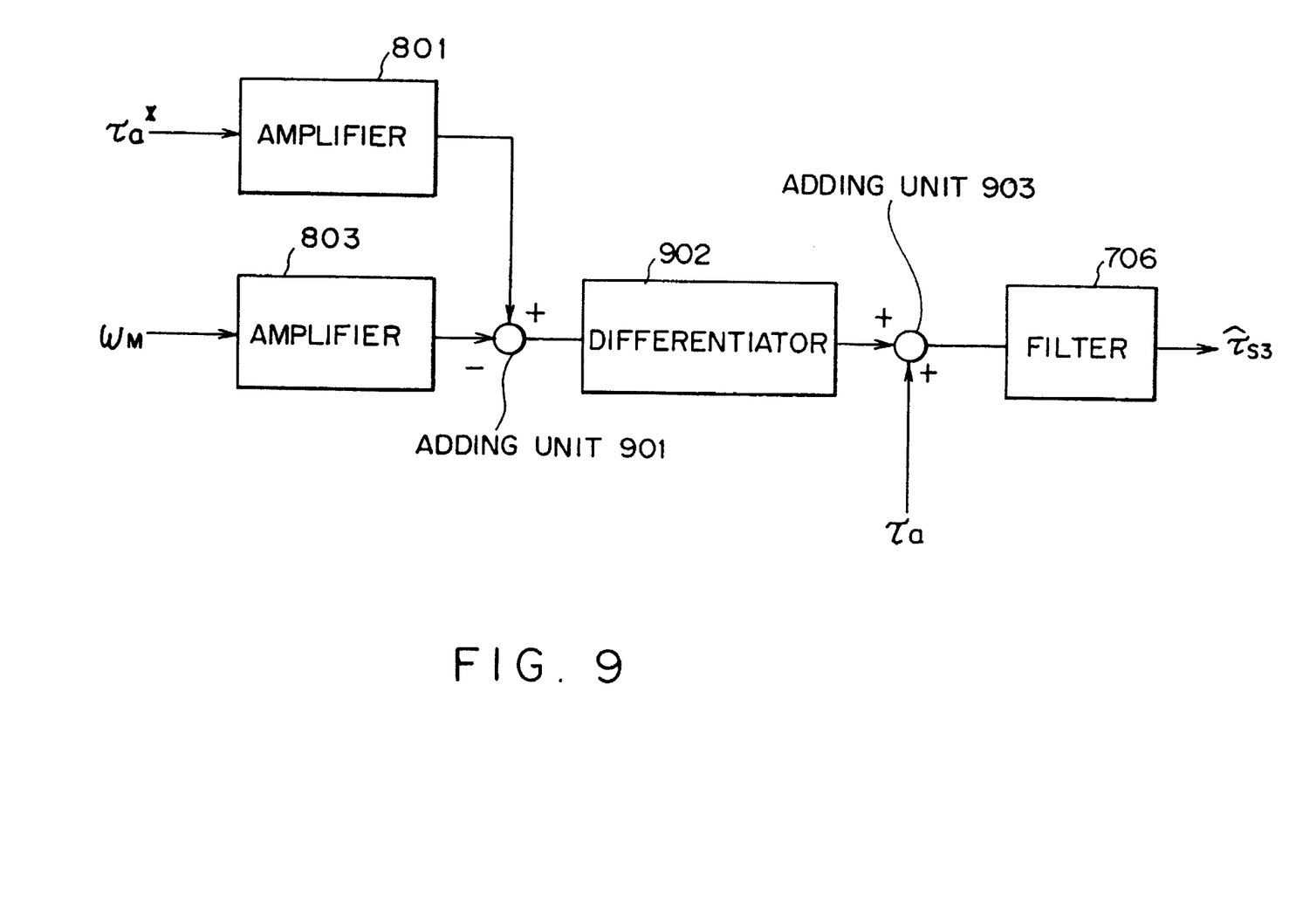
FIG. 9 is a block diagram showing the configuration of the eighth embodiment.

FIG. 9 is a block diagram showing the configuration of the eighth embodiment of the present invention, and specifically shows a further configuration of the compensation torque calculator 601 shown in FIG. 6.

According to the eighth embodiment, the $K3 \cdot \tau_a^*$ can be obtained by inputting the driving torque reference $\tau_a^*$ to the amplifier 801. Likewise, the $J_M' \cdot \omega_M$ can be obtained by amplifying the speed $\omega_M$ through the amplifier 803. An adder 901 obtains the difference between these results, and a differentiator 902 differentiates the difference to obtain the output $s \cdot (K3 \cdot \tau_a^* - J'_M \cdot \omega_M)$. An adder 903 adds the driving torque $\tau_a$ to the output of the differentiator 902, and inputs the sum to the filter 706. However, since the transfer function of the filter 706 is G(s), the output of the filter 706 is the compensation torque $\hat{\tau}s3$ represented in equation (17).

Figure 10:
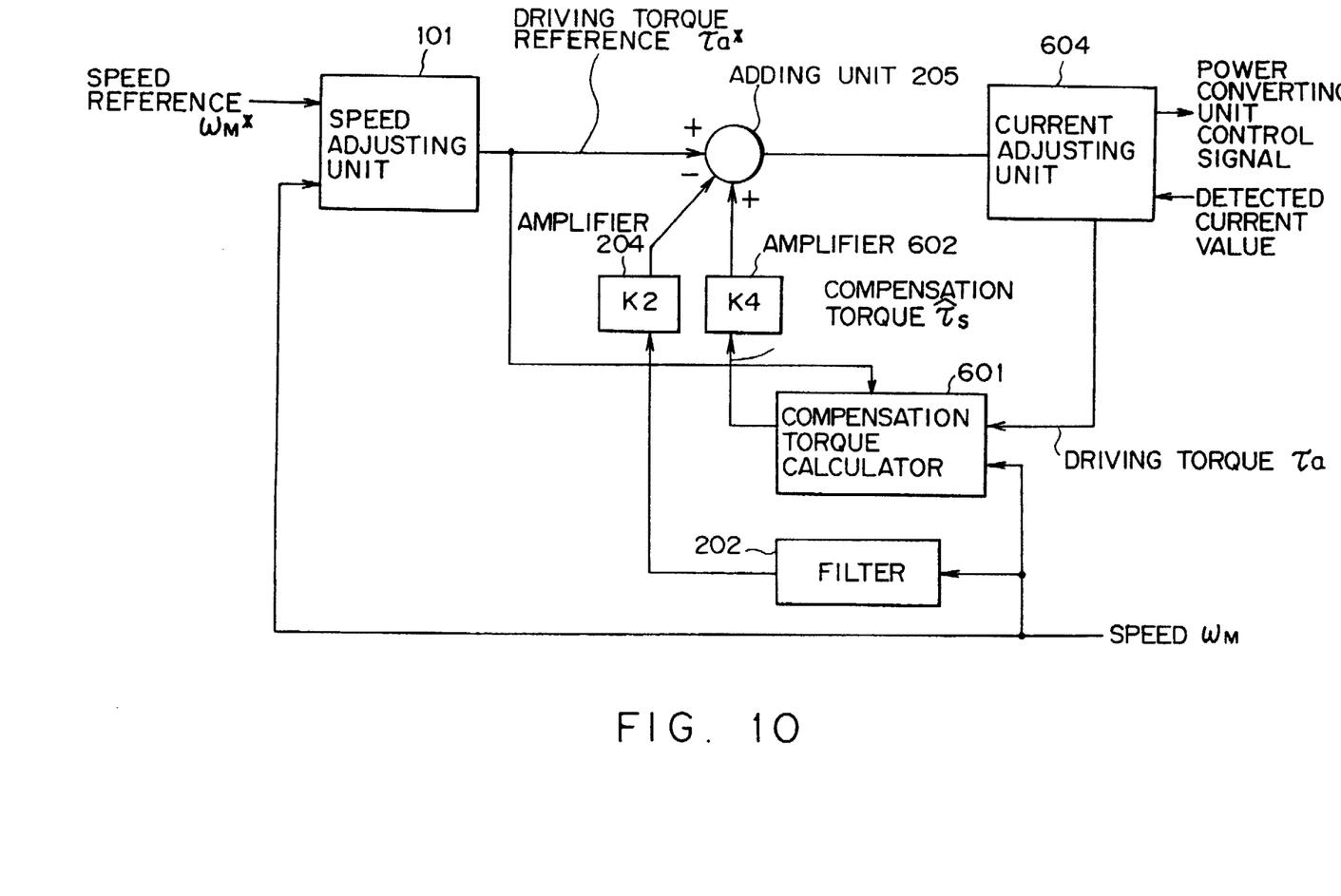
FIG. 10 shows the configuration of the ninth embodiment.

FIG. 10 is a block diagram showing the configuration of the ninth embodiment.

The fifth embodiment shown in FIG. 6 applies to the case where the inertia of a mechanical system is larger than that of a motor itself. On the other hand, the ninth embodiment applies to the case where the inertia of the mechanical system is smaller than that of the motor. The compensation torque calculator 601 receives the driving torque reference $\tau_a^*$ output by the speed adjusting unit 101, the driving torque $\tau_a$ output by the current adjusting unit 604, and the speed $\omega_M$ output by the speed detecting unit 106 and calculates and outputs the compensation torque $\hat{\tau}_s$. The compensation torque $\hat{\tau}_s$ is amplified by the amplifier 602 and added to the driving torque reference $\tau_a^*$ from the speed adjusting unit 101. The filter 202 receives the speed $\omega_M$ from the speed detecting unit 106 and outputs the difference of the speed $\omega_M$. The difference of the speed $\omega_M$ is amplified by the amplifier 204 and subtracted from the driving torque reference $\tau_a^*$ from the speed adjusting unit 101. Thus, the torque phase accelerating the motor inertia can be advanced by the compensation torque calculator 601 and the filter 202, and the torsional vibration can be suppressed. The compensation torque calculator 601 according to the sixth through eighth embodiments shown in FIGS. 7 through 9 can be applied as is.

The present invention as described above is explained by referring to the circuit configuration. However, since it is easy to realize an algorithm having the same capabilities in a discrete time control system using, for example, a microprocessor, the algorithm can obviously included in the present invention.

As described above, the torsional vibration can be suppressed only by advancing the phase of a control system. Accordingly, the torsional vibration can be effectively suppressed even if a loaded mechanical system is complicated. Furthermore, the simple configuration is not easily affected by setting errors of mechanical constants and control constants, and therefore can be easily adjusted. A disturbance observer can be replaced with a compensation torque calculator comprising an amplifier, differentiator, adder, and a filter having an appropriate transfer function. The compensation torque calculator has a simplified circuit configuration as compared with the conventional observer, and can be easily adjusted and maintained.

What is claimed is:

1. A motor vibration control device for matching a detected speed value of a motor with a speed reference value to the motor while controlling vibration of the motor, comprising:

speed adjusting means for outputting a driving torque reference value based on a difference between the speed reference value and the detected speed value;

current adjusting means for adjusting an electric current to be provided for said motor and outputting a driving torque value based on the electric current;

compensation torque calculating means for calculating a compensation torque value based on the detected speed value, the driving torque reference value, and the driving torque value to output the compensation torque value;

first amplifying means for amplifying the compensation torque value; and first adding means for adding the driving torque reference value to the amplified compensation torque value to output a sum to said current adjusting means.

2. The motor vibration control device according to claim 1, wherein said compensation torque calculating means comprises:
        first differentiating means for differentiating the driving torque reference value;
        second amplifying means for amplifying the differentiated driving torque reference value;
        second differentiating means for differentiating the detected speed value;
        third amplifying means for amplifying the differentiated detected speed value;
        second adding means for adding the differentiated and amplified driving torque reference value to the driving torque value, and subtracting the differentiated and amplified detected speed value from a sum; and
        filter means having a predetermined transfer function to calculate the compensation torque value after receiving a calculation result of said second adding means.

3. The motor vibration control device according to claim 1, wherein said compensation torque calculating means comprises:
        second amplifying means for amplifying the driving torque reference value;
        first differentiating means for differentiating the amplified driving torque reference value;
        third amplifying means for amplifying the detected speed value;
        second differentiating means for differentiating the amplified detected speed value;
        second adding means for adding a differentiation result of said first differentiating means to the driving torque value output by said current adjusting means, and subtracting a differentiation result of said second differentiating means from a sum; and
        filter means having a predetermined transfer function to calculate and output the compensation torque value after receiving a calculation result of said second adding means.

4. The motor vibration control device according to claim 1, wherein said compensation torque calculating means comprises:
        second amplifying means for amplifying the driving torque reference value;
        third amplifying means for amplifying the detected speed value;
        third adding means for subtracting the amplified detected speed value from the amplified driving torque value;
        fourth adding means for adding the driving torque value output by said current adjusting means to a calculation result of said third adding means; and
        filter means having a predetermined transfer function to calculate and output the compensation torque value after receiving a calculation result of said fourth adding means.

5. A motor vibration control device for matching a detected speed value of a motor with a speed reference value to the motor while controlling vibration of the motor, comprising:

speed adjusting means for outputting a driving torque reference value based on a difference between the speed reference value and the detected speed value;

current adjusting means for adjusting an electric current to be provided for said motor and outputting a driving torque value based on the electric current;

compensation torque calculating means for calculating a compensation torque value based on the detected speed value, the driving torque reference value, and the driving torque value to output the compensation torque value;

first amplifying means for amplifying the compensation torque value;

first filter means for calculating and outputting a difference in the detected speed value;

second amplifying means for amplifying a difference in the detected speed value received from said first filter means; and first adding means for adding the driving torque reference value to the compensation torque value amplified by said first amplifying means, subtracting the difference in the detected speed value amplified by said second amplifying means from a sum, and outputting a calculation result to said current adjusting means.

6. The motor vibration control device according to claim 5, wherein said compensation torque calculating means comprises:
first differentiating means for differentiating the driving torque reference value;
third amplifying means for amplifying the differentiated driving torque reference value;
second differentiating means for differentiating the detected speed value;
fourth amplifying means for amplifying the differentiated detected speed value;
second adding means for adding the differentiated and amplified driving torque reference value to the driving torque value output by said current adjusting means, and subtracting the differentiated and amplified detected speed value from a sum; and
second filter means having a predetermined transfer function to calculate the compensation torque value after receiving a calculation result from said second adding means.

7. The motor vibration control device according to claim 5, wherein said compensation torque calculating means comprises:
third amplifying means for amplifying the driving torque reference value;
first differentiating means for differentiating the amplified driving torque reference value;
fourth amplifying means for amplifying the detected speed value;
second differentiating means for differentiating the amplified detected speed value;
second adding means for adding a differentiation result of said first differentiating means to the driving torque value output by said current adjusting means, and subtracting the differentiated and amplified detected speed value from a sum; and second filter means having a predetermined transfer function to calculate the compensation torque value after receiving a calculation result from said second adding means.

8. The motor vibration control device according to claim 5, wherein said compensation torque calculating means comprises:
third amplifying means for amplifying the driving torque reference value;
fourth amplifying means for amplifying the detected speed value;
third adding means for subtracting the amplified detected speed value from the amplified driving torque value;
fourth adding means for adding the driving torque value output by said current adjusting means to a calculation result from said third adding means; and
second filter means having a predetermined transfer function to calculate the compensation torque value from an output of said fourth adding means.

9. A motor vibration control method of matching a detected speed value of a motor with a speed reference value to the motor while controlling vibration of the motor, comprising the steps of:

calculating a driving torque reference value based on a difference between the speed reference value and the detected speed value;

calculating a driving torque value based on an electric current to be provided for the motor;

calculating a compensation torque value based on the detected speed value, the driving torque reference value, and the driving torque value;

amplifying the compensation torque value; and adding the driving torque reference value to the amplified compensation torque value to control according to a sum a current value to be output to the motor.

10. A motor vibration control method of matching a detected speed value of a motor with a speed reference value to the motor while controlling vibration of the motor, comprising the steps of:

calculating a driving torque reference value based on a difference between the speed reference value and the detected speed value;

calculating a driving torque value based on an electric current to be provided for the motor;

calculating a compensation torque value based on the detected speed value, the driving torque reference value, and the driving torque value;

amplifying the compensation torque value;

calculating a difference in the detected speed value;

amplifying the difference in the detected speed value; and adding the driving torque reference value to the amplified compensation torque value;

subtracting the amplified difference in the detected speed value from a sum; and controlling a current to be provided to the motor according to a subtraction result.

* * * * *

UNITED STATES PATENT AND TRADEMARK OFFICE
CERTIFICATE OF CORRECTION

PATENT NO. : 5,525,877
DATED : June 11, 1996
INVENTOR(S) : Hidetoshi Umeda

It is certified that error appears in the above-indentified patent and that said Letters Patent is hereby corrected as shown below:

In Drawing :

Figure 8, element 801 "DIFFERENTIATOR" should read -AMPLIFIER-;

Figure 8, element 802 "AMPLIFIER" should read -DIFFERENTIATOR-;

Figure 8, element 803 "DIFFERENTIATOR" should read -AMPLIFIER-;

Figure 8, element 804 "AMPLIFIER" should read -DIFFERENTIATOR-.

Signed and Sealed this

Tenth Day of December, 1996

BRUCE LEHMAN

Attest:

Attesting Officer

Commissioner of Patents and Trademarks